United States Patent [19] [11] 4,094,861
Sundermann et al. [45] June 13, 1978

[54] PROCESS FOR THE PRODUCTION OF NON-INFLAMMABLE POLYTRIAZINES

[75] Inventors: Rudolf Sundermann, New Martinsville, W. Va.; Günther Rottloff, Cologne, Germany; Ernst Grigat, Odenthal-Gloebusch, Germany; Rolf Pütter, Dusseldorf, Germany

[73] Assignee: Bayer Aktiengesellschaft, Germany

[21] Appl. No.: 707,545

[22] Filed: Jul. 22, 1976

[30] Foreign Application Priority Data

Jul. 24, 1975 Germany .............................. 2533122

[51] Int. Cl.$^2$ ............................................. C08G 73/06
[52] U.S. Cl. ................. 260/47 P; 260/47 R; 260/49
[58] Field of Search ...................... 260/47 R, 47 P, 49

[56] References Cited

U.S. PATENT DOCUMENTS

| 2,481,155 | 9/1949 | Schaefer | 260/67.6 |
| 3,244,647 | 4/1966 | Greenley et al. | 260/2 |
| 3,265,639 | 8/1966 | Veltman et al. | 260/2 |
| 3,453,235 | 7/1969 | Klender | 260/47 |

*Primary Examiner*—Lester L. Lee
*Attorney, Agent, or Firm*—Connolly and Hutz

[57] ABSTRACT

Non-inflammable, high molecular weight polytriazines are obtained by condensing less than 3 mols of polyfunctional (amino)phenols with 1 mol phosphorus (oxy) trihalide in the presence of a base, subsequently reacting the still free primary amino or phenolic hydroxyl groups with cyanogen halide in the presence of a base to form cyanamide or organic ester groups and polymerizing thereafter the reaction product at a temperature of up to 350° C, optionally in the presence of polymerization promoters. The polytriazine may be used as plastics and lacquers.

10 Claims, No Drawings

PROCESS FOR THE PRODUCTION OF NON-INFLAMMABLE POLYTRIAZINES

This invention relates to a process for the production of non-inflammable polytriazines by the poly-tri-merisation of aromatic cyanate acid esters containing phosphorus and, optionally, aromatic cyanamide groups.

It is known from German PS 1,190,184 that high molecular weight polytriazines can be obtained by polymerising difunctional or polyfunctional aromatic cyanic acid esters at elevated temperature, optionally in the presence of polymerisation promoters.

In addition, it is known from Japanese Application (JA 6265/66) the primary diamines can be reacted with cyanogen halide to form di(cyanamides) which may be processed into polymers.

One disadvantage of the aforementioned polymers thus produced is their inadequate non-inflammability.

It has now been found that non-inflammable high molecular weight polytriazines which are substantially insoluble in solvents can be obtained by condensing compounds corresponding to the general formula (I)

  (I)

in which Ar represents an aromatic radical or an aromatic radical interrupted by bridge members, $n$ is one of the numbers 0, 1 or 2 and $m$ is one of the numbers 1, 2, 3 or 4, the sum of $n + m$ being at least 2, with a phosphorus(oxy)trihalide in the presence of a base, less than 3 mols of (amino)phenol corresponding to formula (I) above being used per mol of phosphorus-(oxy)trihalide, subsequently reacting the still free primary amino or phenolic hydroxyl groups with cyanogen halide in the presence of a base or mixture of bases to form cyanamide or cyanic acid ester groups and, polymerising the reaction products at a temperature of up to 350° C, optionally in the presence of polymerisation promoters.

The aminophenols preferably correspond to the general formula (II)

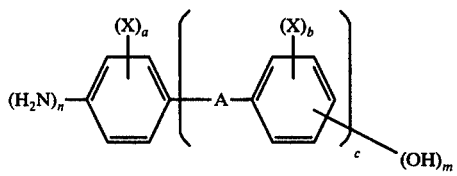  (II)

in which X = hydrogen, halogen, linear or branched chain $C_1$–$C_9$ alkyl, phenyl or two adjacent alkyl radicals on the same nucleus together form a carbocyclic 5- or 6-membered ring or together, and in conjunction with a hetero atom (O,S,N), form a 5- membered or 6- membered heterocyclic ring, A = oxygen, the sulphonyl group (—SO$_2$—), the carbonyl group (—CO—), the carbonyl dioxy group

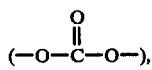

an alkylene group with 1 to 9 carbon atoms optionally substituted by $C_1$–$C_4$ alkyl radicals or phenyl, a cycloaliphatic or aromatic 5-membered or 6-membered ring or a direct bond;

$n$ = one of the numbers 1, 2 or 3;
$m$ = one of the numbers, 1, 2 or 3;
$a$ = 5- $n$ where $c$ = 1, and 6- m-n where $c$ = 0;
$b$ = 5- $m$ and
$c$ = 0 or 1.

More especially, the symbols in formula II above have the following meanings:
X = hydrogen, chlorine or bromine, especially chlorine, linear or branched chain $C_1$–$C_4$ alkyl groups or two radicals X, which substitute adjacent carbon atoms, form together with those carbon atoms a carbocyclic 6-membered ring (for example a benzene ring);
A = oxygen, the sulphonyl group, the carbonyl group, the carbonyl dioxy group, a linear or branched alkylene group with 1 to 4 carbon atoms or a single bond;
$n$ = the number 1 or 2, more especially the number 1;
$m$ = the number 1 or 2, more especially the number 1;
$a$ = the number 1 or 2, more especially the number 1;
$b$ = the number 1 or 2, more especially the number 1, and
$c$ = the number 0 or 1.

In cases where, in formula II above, the aromatic nucleus is substituted by several radicals X, the substituents may be the same or different.

Of the number of aminophenols, the following are mentioned as examples of compounds corresponding to general formula I: m-, p-aminophenol, 2-methyl-4-aminophenol, 2-methyl-5-aminophenol, 3-methyl-4-aminophenol, 3 methyl-5-aminophenol, 4-methyl-3-aminophenol, 2,4-dimethyl-5-amino- phenol, 2,5-dimethyl-4-aminophenol, 2,6-dimethyl-3-aminophenol 2,6-dimethyl-4-aminophenol, 3,5-dimethyl-4-amino-phenol, 6-chloro-3-aminophenol, 3-chloro-4-aminophenol, 2-ethyl-4-aminophenol, 2-isopropyl-4-aminophenol, 3-methyl-5-ethyl-4-aminophenol, 2,3,5-trimethyl-4-aminophenol, 2-sec.-butyl-4-aminophenol, 2-tert.-butyl-4-aminophenol, 2-isopropyl-5-methyl-4-aminophenol, 3-methyl-5-isopropyl-4-aminophenol, 2,6-diisopropyl-4-aminophenol, 2,6-di-tert.-butyl-4-amino phenol, 4-aminomethylphenol, 4-aminoethylphenol, 5-amino-α-naphthol, 7-amino-β-naphthol, 8-amino-β-naphthol, 2-(4-aminophenyl)-2-(4-hydroxyphenyl)propane, 4-amino-4'-hydroxydiphenyl, 4-amino-4'-hydroxy diphenyl ether, 4-amino-4'-hydroxy diphenyl suphone and 4-amino-4'-hydroxy diphenyl methane.

If, in the formula I $n$ = 0, the resulting compounds are aromatic dihydroxy and polyhydroxy compounds free from amino groups.

Virtually any aromatic and aromatic-heterocyclic, optionally substituted compounds containing two or more phenolic hydroxy groups may be used providing the substituents, if any, are stable and do not themselves react under the conditions of the process according to the invention.

The aromatic hydroxy compounds which may be used in the process according to the invention preferably correspond to the general formula III.

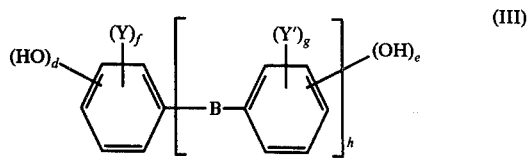  (III)

in which

Y = hydrogen, halogen, alkyl, phenyl, two or more radicals not having to be the same, or two radicals Y which substitute an adjacent carbon atom form with those carbon atoms a carbocyclic or heterocyclic ring, alkoxy radicals or alkoxy carbonyl radicals;

Y' the same meaning as Y or the group (IV)

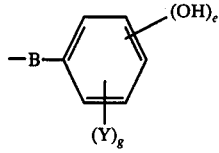

B = a direct bond, the sulphonyl group (—SO₂—), the carbonyl group (—CO—), the carbonyl dioxy group,

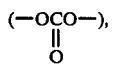

oxygen, an alkylene chain with 1 to 9 carbon atoms optionally substituted by alkyl radicals or phenyl, a cycloaliphatic or aromatic 5- or 6-membered ring optionally interrupted by oxygen;

$d$ = one of the numbers 1 to 4 where $h \leq 1$ and one of the numbers 2 to 4 where $h = 0$;

$e$ = one of the numbers 1 to 4, $f$ = 5-$d$ where $h \leq 1$ and 6-$d$-$e$ where $h = 0$, $g$ = 5-$e$, $h$ = one of the numbers 0, 1, 2 and 3, with the proviso that the sum of $d + e$ always gives one of the numbers 2 to 4.

More especially, the symbols in formula (III) have the following meanings:

Y = hydrogen, fluorine, chlorine or bromine, linear or branched chain $C_1$-$C_5$ alkyl, methoxy, ethoxy, methoxy carbonyl, ethoxy carbonyl, butoxy carbonyl;

Y' = the same meaning as Y;

B = a direct bond, oxygen, the sulphonyl group, the carbonyl group, the carbonyl dioxy group, the methylene, ethylene group, the 2,2-propylene group

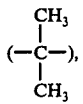

the cyclohexylene radical;

$d$ = the number 1 where $h = 1$ and the number 2 where $h = 0$;

$e$ = the number 0 or 1, more especially the number 1;

$f$ = the number 1 or 2, more especially the number 1;

$g$ = the number 1 or 2, more especially the number 1; and $h$ = the number 0 or 1, with the proviso that $d + e = 2$.

The following are mentioned as examples of compounds corresponding to the general formula III above: m,- p-dihydroxy benzene, 2-tert.-butyl hydroquinone, 2,4-dimethyl resorcinol, 2,5-di-tert.-butyl hydroquinone, tetramethyl hydroquinone, 2,4,6-trimethyl resorcinol, 2,6-di-tert.butyl hydroquinone, 4-chlororesorcinol, dihydroxy naphthalenes for example, 1,4-, 1,5-, 1,6-, 1,7-, 2,6-, 2,7-dihydroxy naphthalene; dihydroxy diphenyls for example, 4,4'-dihydroxy diphenyl, 2,2'-dihydroxy diphenyl, 3,3', 5,5'-tetramethyl-4,4'-dihydroxy diphenyl, 3,3', 5,5'-tetrachloro-4,4'-dihydroxy diphenyl, 3,3', 5,5'-tetrachloro-2,2'-dihydroxy diphenyl, 2,2', 6,6'-tetrachloro-4,4'-dihydroxy diphenyl, 4,4'-bis[(3-hydroxy)-phenoxy]-diphenyl, 4,4'-bis-[(4-hydroxy)-phenoxy]-diphenyl; 2,2'-dihydroxy-1,1'-binaphthyl; dihydroxy diphenyl ethers, for example, 4,4'-dihydroxy diphenyl ether, 3,3' 5,5'-tetramethyl-4,4'-dihydroxy diphenyl ether, 3,3', 5,5'-tetrachloro-4,4'-dihydroxy diphenyl ether, 4,4'-bis-[p-hydroxyphenoxy]-diphenyl ether, 4,4'-bis-[p-hydroxyphenylisopropyl]-diphenyl ether, 4,4'-bis[p-hydroxyphenoxy]-benzene, 4,4'-bis-[m-hydroxyphenoxy]-diphenyl ether, 4,4'-bis-[4-(4-hydroxyphenoxy)-phenyl sulphone]-diphenyl ether; diphenyl sulphones such as, for example, 4,4'-dihydroxy diphenyl sulphone, 3,3', 5,5'-tetramethyl-4,4'-dihydroxy diphenyl sulphone, 3,3', 5,5'-tetrachloro-4,4'-dihydroxy diphenyl sulphone, 4,4'-bis-[p-hydroxyphenylisopropyl]-diphenyl sulphone, 4,4'-bis [(4-hydroxy)-phenoxy)-phenoxy]-diphenyl sulphone, 4,4'-bis[(3-hydroxy)-phenoxy]-diphenyl sulphone, 4,4'-bis-[4-(4-hydroxyphenyl isopropyl)-phenoxy]-diphenyl sulphone, 4,4'-bis-[4-(4-hydroxyphenylsulphone)-phenoxy]-diphenyl sulphone, 4,4'-bis-[4-(4-hydroxy)-diphenoxy]-diphenyl sulphone; dihydroxy diphenyl alkanes such as, for example, 4,4'-dihydroxy diphenyl methane, 4,4'-bis[p-hydroxyphenyl]-diphenyl methane, 2,2-bis-(p-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dichloro-4-hydroxyphenyl)-propane, 1,1-bis-[p-hydroxphenyl]-cyclohexane, bis-[2-hydroxy-1-naphthyl]-methane, 1,2-bis-[p-hydroxyphenyl]-1,1,2,2-tetramethyl ethane, 4,4'-dihydroxy benzophenone, 4,4'-bis-(4-hydroxyphenoxy)-benzophenone, 1,4-bis-[p-hydroxyphenylisopropyl]-benzene, phloroglucinol, 2,2', 5,5'-tetrahydroxy diphenyl sulphone.

In the context of the invention, phosphorus(oxy)-trihalides are phosphorus trichloride, phorphorus tribromide, phosphorus oxychloride, phosphorusoxy bromide and phosphorus thiochloride, preferably phosphorus chloride.

More than 0.5 mol and less than 3 mols of the compounds of formula (I) are used per mol of phosphorus-(oxy)trihalide. The following molar ratios have been found to be particularly favourable, based in each case on 1 mol of phosphorus(oxy) trihalide:

| difunctional compounds (n+m=2) | >1.5 to <3 mols |
| trifunctional compounds | >1 to <3 mols |
| tetrafunctional compounds | >0.75 to <3 mols |
| pentafunctional compouns | >0.6 to <3 mols |
| hexafunctional compounds | >0.5 to <3 mols |

In this case, it is virtually only higher condensates that are formed, i.e., condensates containing more than one phosphorus atom per condensate molecule. For producing the monomolecular condensates containing one phosphorus atom, for example of the formula 0 = P (OC₆H₅OH)₃, it is necessary in theory to use 3 mols of diphenol and, in practice, from 4 to 10 and more mols of diphenol.

Condensation of the phosphorus(oxy)trihalide with the aminophenol or di- or poly-phenol may be carried out either as such or in inert solvents or suspension media in the presence of a base at temperatures in the range from −40° to 250° C and preferably at temperatures in the range from 0° to 150° C.

The phenolates may of course also be directly used.

The following compounds represent suitable solvents or suspension media:

Aliphatic ketones such as acetone, methyl ethyl ketone diethyl ketone, methyl isopropyl ketone, methyl isobutyl ketone; aliphatic or aromatic hydroxcarbons, preferred aliphatic hydrocarbons being the fractions accumulating during distillation of the naturally occurring mixtures, such as petroleum ether, light petrol, petrol whilst examples of aromatic hydrocarbons are benzene, toluene and the xylenes; aliphatic and aromatic chlorinated hydrocarbons such as dichloromethane, dichloroethane, perchloroethylene, dichloropropane, chlorobenzene, dichlorobenzene; ethers such as diethyl ether, diisopropyl ether, nitrohydrocarbons such as nitromethane, nitrobenzene; amides such as diemthyl formamide, dimethyl acetamide or mixtures thereof.

The following bases may be used for the condensation reaction: alkali metal hydroxides, such as sodium hydroxide, potassium hydroxide, alkaline earth metal hydroxides, such as calcium hydroxide, carbonates such as sodium carbonate, potassium carbonate, calcium carbonate, or tertiary amines such as trimethyl amine and triethyl amine.

The bases or mixtures of bases are used in quantities of up to 3.2 mols and preferably in quantities of up to 3 mols per mol of phosphorus(oxy)trihalide.

On completion of condensation, the phosphorus-containing (amino)phenols or di- or poly-phenols, following removal of the salts, if any, by washing out, filtration, centrifuging etc., may be reacting in solution or suspension with cyanogen halide in the presence of a base by the process known from U.K. PS No. 1,007,790 for the production of aromatic cyanic acid esters. From 1 to 1.1 mol of cyanogen halide and 1 mol of a base or base mixture may be used for every primary amino or for every phenolic hydroxyl group. The reaction may be carried out at temperatures in the range from −40° C to 65° C. Suitable bases include inorganic bases such as sodium hydroxide, potassium hydroxide, soda, potash, calcium hydroxide or tertiary amines, such as trimethyl amine or triethyl amine, whilst suitable solvents or suspending agents are water, alcohols, ketones, hydrocarbons, chlorinated hydrocarbons or mixtures thereof.

In cases where it is desired to use products containing phosphorus, cyanamide and cyanic acid ester groups or phosphorus and cyanic acid ester groups that are particularly stable in storage for the production of the polytriazines or their prepolymers, it is advisable to adopt a procedure similar to that described in our copending U.S. Applications, Ser. No. 658,814 or 658,815 which relate to the production of highly pure polyvalent cyanic acid esters without any cyanamide groups.

According to our copending U.S. Application, Ser. No. 658,814, filed Feb. 17, 1976 di- or poly- trialkyl ammonium phenolates (for example poly-triethylammonium phenolates) are reacted with an excess of cyanogen halide in an organic solvent, optionally in the presence of catalytic quantities of trialkyl amines, such as triethyl amine, to form the corresponding aromatic cyanic acid esters.

According to our copending U.S. Application, Ser. No. 658,815, filed Feb. 17, 1976 alkali metal or alkaline earth metal salts, preferably sodium, potassium, calcium und barium salts of aromatic di- or poly-hydroxy compounds, are reacted with cyanogen halide in a solvent, optionally in the presence of catalytic quantities of a tertiary amine.

In these processes, from 1 to 2 mols and preferably from 1 to 1.4 mols of cyanogen halide may be used for every primary amino group or for every phenolic hydroxyl group, whilst from 1 to 1.8 mols, preferably from 1 to 1.3 mols, of a base or base mixture may be used for every primary amino group or for every phenolic hydroxyl group, the base or the base mixture always being used in a deficit relative to the cyanogen halide.

Examples of suitable solvents are water, lower aliphatic alcohols, such as methanol, ethanol, propanol, isopropanol, butanol; aliphatic ketones such as acetone, methyl ethyl ketone, diethyl ketone, methyl isopropyl ketone, methyl isobutyl ketone; aliphatic or aromatic hydrocarbons, preferred aliphatic hydrocarbons being the fractions accumulating during distillation of the naturally occurring mixtures, such as petroleum ether, light petrol, petrol, whilst examples of aromatic hydrocarbons are benzene, toluene and xylenes: aliphatic and aromatic chlorinated hydrocarbons such as dichloromethane, dichloroethane, perchlorethylene chlorobenzene, dichlorobenzene; ethers such as diethyl ether, diisopropyl ether, dioxan, tetrahydrofuran, di-secbutyl ether, nitrohydrocarbons such as nitromethane, nitrobenzene, nitrotoluene, amides such as dimethyl formamide, dimethyl acetamide and mixtures thereof.

Suitable inorganic or organic bases are those mentioned in U.K. PS No. 1,007,790.

The process according to the invention is generally carried out at temperatures in the range from −40° C to +65° C and preferably at temperatures in the range from 0 to 30° C. In cases where cyanogen chloride is used, the reaction is preferably carried out below the boiling point (13° C) although where cyanogen bromide is used the reaction may even be carried out at temperatures above 50° C.

In general, the reaction is carried out by dissolving or suspending the phosphorus-containing amino phenols or di- or poly-phenols, the inorganic and/or organic base in the solvent and introducing the resulting solution or suspension with stirring into a solution of cyanogen halide in the solvent. The cyanic acid esters containing cyanamide groups or the cyanic acid esters formed may readily be freed from the inorganic or organic salts adhering to them by extraction and may be isolated by methods known per se such as filtration, vacuum filtration and centrifuging.

Tertiary amines, which are used in catalytic quantities (0.001 to 10% by weight, more especially 0.001 to 1.0% by weight, based on alkali metal or alkaline earth metl phonolate) in accordance with our copending U.S. Application Ser. No. 658,815, filed Feb. 17, 1976 correspond to the general formula

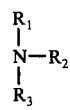

in which $R_1$, $R_2$, $R_3$ = alkyl, aryl and cycloalkyl radicals, which do not have to be the same as one another, with from 1 to 36 carbon atoms, more especially with up to 18 carbon atoms, for example trimethyl amine, triethyl amine, methyl diethyl amine, tripropyl amine, tributyl amine, methyl dibutyl amine, dinonylmethyl amine, dimethyl stearyl amine, dimethyl cyclohexyl amine, diethyl aniline.

Suitable cyanogen halides are, in particular, the commercially readily obtainable cyanogen chloride and cyanogen bromide.

The products containing phosphorus, cyanic acid ester and, optionally, cyanamide groups obtained in accordance with the invention represent prepolymers of liquid, wax-like or solid consistency and are soluble in organic solvents. They are extremely stable in storage.

As shown by the IR-spectrum, they have hardly any triazine structures, but instead show the band of the —O—C≡N— group at 4.5 μ.

The prepolymers may be converted into high molecular weight polymers of triazine structure by heating to a temperature of from about 50° C to 350° C preferably to a temperature of from 100° C to 250° C optionally in the presence of a catalyst or catalyst mixture, either in the presence or absence of a solvent. The end products are substantially insoluble in solvents and can no longer be melted. As shown by the IR-spectrum, the polymer contains no linkage principles apart from triazine structures.

The formation of the high molecular weight polymers with triazine structures from the cyanic acid esters containing cyanamide groups is indicative of the fact that cyanic acid ester and cyanamide groups participate equally in formation of the triazine ring.

Suitable catalysts for the production of the high molecular weight polymer product with triazine structures include acids, bases, salts, nitrogen and phosphorus compounds, for example Lewis acids such as $AlCl_3$, $BF_3$, $FeCl_3$, $TiCl_4$, $ZnCl_2$, $SnCl_4$, proton acids, such as HCl, $H_3PO_4$; aromatic hydroxy compounds such as phenol, p-nitrophenol, pyrocatechol, dihydroxy naphthalene; sodium hydroxide, sodium methylate, sodium phenolate, trimethyl amine, triethyl amine, tributyl amine, diazabicyclo-(2,2,2)-octane, quinoline isoquinoline, tetrahydroisoquinoline, tetraethyl ammonium chloride, pyridine-N-oxide, tributyl phosphine, phospholine —$\Delta^3$-1-oxa-1-phenyl, zinc octoate, tin octoate, zinc naphthanate and mixtures thereof.

The catalysts may be used in quantities of from 0.001 to 10% by weight, based on prepolymer or on cyanic esters containing cyanamide groups, or if desired in even larger quantities.

The compounds containing phosphorus, cyanamide and/or cyanic acid ester groups may be used, in solution in inert solvents such as acetone, benzene, xylene, chlorobenzene, ethyl acetate, tetrahydrofuran, dibutyl ether, dimethyl formamide, or in powder form, for the production of coatings on such substrates as metals, ceramics, glass and earthenware etc., or, in solution in organic solvents, as impregnating lacquers or laminating resins. If desired, the starting compounds may be combined with fillers, pigments, glass fibres, metal fibres and glass cloths and used for the production of mouldings or laminates. Yellow to brown coloured, transparent end products of extreme hardness and high temperature resistance coupled with good non-inflammability, are obtained after hardening.

It is of course also possible to mix the products obtained in accordance with the invention with other products containing cyanic acid ester and/or cyanamide groups before conversion into polytriazines and subsequently to polytrimerise the resulting mixtures.

The percentage contents and parts quoted in the Examples relate to weight unless otherwise indicated.

EXAMPLE 1

684 g (3 mols) of bis-2,2-(4-hydroxyphenyl)-propane were initially introduced with 161 g (1.05 mols) of distilled phosphorus oxychloride into 1.5 liters of methylene chloride. 318 g (3.15 mols) of triethylamine were slowly added dropwise with stirring to the resulting solution at reflux temperature. This was followed by stirring under reflux for 3 hours. After cooling, the triethylamine hydrochloride precipitated was filtered off under section and washed with methylene chloride. The combined methylene chloride phases were washed with water until free from chloride. The solvent was distilled off and the residue freed from the residual solvent at 100° C/0.2 bar. 727 g (98.8% of the theoretical yield) of phosphoric acid ester were obtained, mp: 84°–90° C.

72.8 g (0.1 mol) of the phosphoric acid ester thus obtained were dissolved in 200 ml of acetone at 0° C with 20 g (0.33 mol) of cyanogen chloride. 31.3 g (0.31 mol) of triethylamine were added dropwise at 0° C to +5° C. The triethylamine hydrochloride was filtered off and the solvent distilled off. The residue was taken up in 200 ml of methylene chloride and washed with water until free from chloride. Removal of the solvent by distillation left the phosphorus containing aromatic cyanic acid ester in a yield of 78 g (97%). The product obtained was easily characterised in the IR-spectrum by the band typical of the —O—C≡N— group at 4.5 μ.

10 g of the phosphorus-containing cyanic acid ester were heated for 5 hours to 180° C and then for 1 hour to 200° C. A yellow-brown, extremely hard, brittle, transparent and non-inflammable polytriazine was obtained, showing the band characteristic of the s-triazine ring at 6.4 and 7.25 μ in the IR-spectrum.

EXAMPLE 2

85.2 g (0.3 mol) of bis-2,2-(4-hydroxy-3,5-dimethylphenyl)-propane were reacted as in Example 1 with 16.8 g (0.11 mol) of phosphorus oxychloride in 300 ml of dichlorethane and with 33.4 g (0.33 mol) of triethylamine. 89 g (99% of the theoretical yield) of phosphoric acid ester were obtained. 90 g (0.1 mol) of the phosphoric acid ester thus obtained were reacted as in Example 1 with 20 g (0.33 mol) of cyanogen chloride and 31.3 g (0.31 mol) of triethyl amine in 200 ml of dimethyl acetamide. 90 g of phosphorus-containing cyanic acid ester were obtained corresponding to a yield of 92.5% of the theoretical yield. IR-spectrum: —O—C≡N— band at 4.5 μ. Hardening to form a very hard, light yellow, transparent non-inflammable polytriazine was carried out over a period of 4 hours at 180° C in the presence of 0.05% by weight of zinc octoate.

EXAMPLE 3

66 g (0.6 mol) of hydroquinone and 33.6 g (0.22 mol) of phosphorus oxychloride were reacted as in Example 2 with 66.8 g (0.66 mol) of triethylamine. 40 g (0.66 mol) of cyanogen chloride were directly added to the resulting dichloroethane solution of the phosphorus ester, followed by reaction at 0° C with 62.6 g (0.62 mol) of triethylamine. The triethylamine hydrochloride precipitated was filtered off and washed with dichloroethane. The combined dichloroethane solutions were washed with water until free from chloride. Removal of the solvent by distillation left 82 g (91% of the theoretical yield) of phosphorus-containing cyanic acid ester (IR-spectrum: —O—C≡N— band at 4.5 μ).

Hardening of this cyanic acid ester was carried out over a period of 5 hours at 210° C following the addition of 0.05% by weight of pyrocatechol and 0.05% by weight of diazabicyclo-(2,2,2)-octane. A light brown, brittle, hard non-inflammable, polytriazine was obtained.

EXAMPLE 4

68.4 g (0.3 mol) of bis-2,2,2-(4-hydroxyphenyl)-propane were reacted as in Example 1 with 17.8 g (0.105 mol) of phosphorus thiochloride in 300 ml of methylene chloride and with 31.8 g (0.315 mol) of triethylamine. The phosphoric acid ester thus obtained was reacted at 0° C with 20 g (0.33 mol) of cyanogen chloride and 31.3 g (0.31 mol) of triethylamine in dimethyl acetamide in the same way as in Example 1 to form a dark brown phosphorus-containing cyanic acid ester. (IR-spectrum: —OCN at 4.5 μ).

A hard, brittle, black-brown coloured non-inflammable polytriazine was obtained from this cyanic acid ester by heating for 3 hours at 170° C.

EXAMPLE 5

68.1 g (0.3 mol) of 2-(4-hydroxyphenyl)-2-(4-aminophenyl)-propane were reacted with 16 g (0.1045 mol) of phosphorus oxychloride in 300 ml of methylene chloride and with 31.8 g (0.315 mol) of triethylamine in the same way as in Example 1. 73 g (0.1 mol) of the phosphoric acid triamide thus obtained were reacted at 0° C with 20 g (0.33 mol) of cyanogen chloride in 200 ml of methyl ethyl ketone and with 31.3 g (0.31 mol) of triethylamine in the same way as in Example 1 to form a phosphorus-containing cyanic acid ester (—O—C≡N—band at 4.5 μ). Hardening of this cyanic acid ester to form a brown, extremely hard, non-inflammable polytriazine was carried out over a period of 3 hours at 230° C in the presence of 0.01% by weight of zinc octoate.

EXAMPLE 6

32.7 g (0.3 mol) of p-aminophenol were reacted with 16 g (0.1045 mol) of phosphorus oxychloride and with 31.8 g (0.315 mol) of triethylamine in the same way as in Example 5. 37 g (0.1 mol) of the phosphoric acid triamide thus obtained were reacted at 0° C with 20 g (0.33 mol) of cyanogen chloride in 200 ml of methylene chloride and with 31.3 g (0.31 mol) of triethylamine in the same way as in Example 5. 4.0 g (89% of the theoretical yield) of phosphorus-containing cyanic acid ester were obtained (IR-spectrum: —O—C≡N at 4.5 μ).

Hardening to form a hard, brown, non-inflammable polytriazine was carried out over a period of 3 hours at 200° C in the presence of 0.01% by weight of tin octoate.

EXAMPLE 7

50 parts of bis-2,2-(4-cyanatophenyl)-propane and 50 parts of the phosphorus-containing cyanic acid ester obtained in accordance with Example 1 were mixed and polymerised over a period of 6 hours at 180° C in the presence of 0.01% by weight of zinc octoate to form a hard, honey-coloured substantially non-inflammable polytriazine.

We claim:

1. A process for producing a polytriazine which comprises reacting more than 0.5 mol and less than 3 mols of a compound of the formula

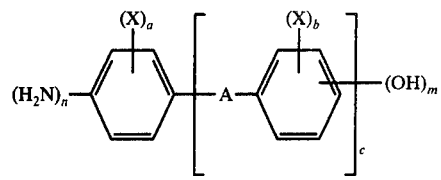

wherein:
each X is hydrogen, halogen, alkyl having 1 to 9 carbon atoms or phenyl;
A is —O—, —SO$_2$—, —CO—,

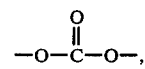

alkylene having 1 to 9 carbon atoms or said alkylene substituted by phenyl or alkyl having 1 to 4 carbon atoms, or a direct bond;
$n$ is 1, 2 or 3;
$m$ is 1, 2 or 3;
$c$ is 0 or 1;
$a$ is 5-$n$ where $c$ is 1 and 6-$m$-$n$ where $c$ is 0; and
$b$ is 5-$m$ is condensed with 1 mol of a phosphorus compound selected from the group consisting of phosphorus trihalide and phosphorus oxytrihalide in the presence of a base selected from the group consisting of alkali metal hydroxides, alkali metal carbonates, alkaline earth metal carbonates and tertiary amines in an amount of up to 3.2 mols of base per mol of said phosphorus compound and at a temperature of from −40° to 250° C, thereafter reacting the resulting compound with 1 to 1.1 mol of cyanogen halide in the presence of 1 mol of an inorganic base or a tertiary amine for every primary amino or every phenolic hydroxyl group and at a temperature of −40° to 65° C, and polytrimerizing the latter reaction product at a temperature of from 50° to 350° C to form polytriazine product.

2. The process of claim 1 wherein more than 1.5 mols but less than 3 mols of a compound of said formula is condensed per mol of said phosphorus compound.

3. The process of claim 1 wherein the said resulting compound is a di- or polytrialkylammonium phenolate which is reacted with an excess of cyanogen halide in the presence of a catalytic amount of a trialkyl amine.

4. The process of claim 1 wherein an alkali metal or alkaline earth metal salt of the said resulting compound is reacted with an excess of cyanogen halide in the presence of a catalytic amount of a tertiary amine.

5. A polytriazine produced by the process of claim 1.

6. A process for producing a polytriazine which comprises reacting more than 0.5 mol and less than 3 mols of a compound of the formula

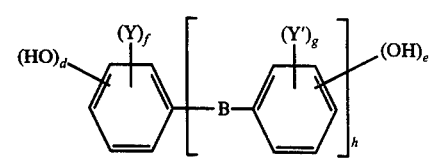

wherein:

Y is hydrogen, halogen, alkyl having 1 to 5 carbon atoms, phenyl, alkoxy having 1 to 2 carbon atoms or alkoxy carbonyl;

Y' is the same as Y or is the group

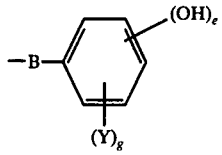

wherein B is a direct bond, —SO$_2$—, —CO—,

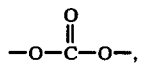

—O—, alkylene having 1 to 9 carbon atoms or said alkylene substituted by methyl or by phenyl, $h$ is 0, 1, 2 or 3;

$d$ is 1 to 4 when $h \leq 1$ and 2 to 4 when $h$ is 0;

$e$ is 1 to 4;

$f$ is 5-$d$ when $h$ is $\leq 1$ and 6-$d$-$e$ when $h$ is 0; and $g$ is 5-$e$ with the proviso that the sum of $d + e$ is from 2 to 4 is condensed with 1 mol of a phosphorus compound selected from the group consisting of phosphorus trihalide and phosphorus oxytrihalide in the presence of a base selected from the group consisting of alkali metal hydroxides, alkali metal carbonates, alkaline earth metal carbonates and tertiary amines in an amount of up to 3.2 mols of base per mol of said phosphorus compound and at a temperature of from −40° to 250° C, thereafter reacting the resulting compound with 1 to 1.1 mol cyanogen halide in the presence of 1 mol of an inorganic base or a tertiary amine for every phenolic hydroxy group and at a temperature of −40° to 65° C, and polytrimerizing the latter reaction product at a temperature of from 50° to 350° C to form polytriazine product.

7. The process of claim 6 wherein more than 1.5 mols but less than 3 mols of a compound of said formula is condensed per mol of said phosphorous compound.

8. The process of claim 6 wherein the said resulting compound is a di or polytrialkylammonium phenolate which is reacted with an excess of cyanogen halide in the presence of a catalytic amount of a trialkyl amine.

9. The process of claim 6 wherein an alkali metal or alkaline earth metal salt of the said resulting compound is reacted with an excess of cyanogen halide in the presence of a catalytic amount of a tertiary amine.

10. A polytriazine produced by the process of claim 6.

* * * * *